(12) United States Patent
Rinner

(10) Patent No.: US 9,583,262 B2
(45) Date of Patent: Feb. 28, 2017

(54) MULTI-LAYER COMPONENT AND METHOD FOR PRODUCING SAME

(75) Inventor: Franz Rinner, Deutschlandsberg (AT)

(73) Assignee: EPCOS AG, Munich (DE)

( * ) Notice: Subject to any disclaimer, the term of this patent is extended or adjusted under 35 U.S.C. 154(b) by 306 days.

(21) Appl. No.: 14/344,318

(22) PCT Filed: Aug. 1, 2012

(86) PCT No.: PCT/EP2012/065075
§ 371 (c)(1),
(2), (4) Date: Sep. 24, 2014

(87) PCT Pub. No.: WO2013/037559
PCT Pub. Date: Mar. 21, 2013

(65) Prior Publication Data
US 2015/0043127 A1 Feb. 12, 2015

(30) Foreign Application Priority Data
Sep. 15, 2011 (DE) .................. 10 2011 113 496

(51) Int. Cl.
*H01G 4/012* (2006.01)
*H01G 4/30* (2006.01)
*H01C 7/18* (2006.01)

(52) U.S. Cl.
CPC ............... *H01G 4/012* (2013.01); *H01C 7/18* (2013.01); *H01G 4/30* (2013.01); *Y10T 29/43* (2015.01)

(58) Field of Classification Search
None
See application file for complete search history.

(56) References Cited

U.S. PATENT DOCUMENTS 5,172,299 A * 12/1992 Yamada .................... H01G 4/30
361/321.2
8,716,778 B2 * 5/2014 Chen ................... H01L 23/5223
257/303

(Continued)

FOREIGN PATENT DOCUMENTS

DE 19622690 A1 12/1996
DE 19719174 A1 11/1998

(Continued)

OTHER PUBLICATIONS

Wikipedia: "Siebdruck", http://de.wikipedia.org/wiki/Siebdruck, retrieved Aug. 6, 2012, pp. 1-25 (Corresponding to English Wikipedia article "Screen printing", http://en.wikipedia.org/wiki/Screen_printing, retrieved Feb. 13, 2014, pp. 1-10).

*Primary Examiner* — Dion R Ferguson
(74) *Attorney, Agent, or Firm* — McDermott Will & Emery LLP

(57) ABSTRACT

The multi-layer component has a main body (1) made of ceramic layers (2) and two-dimensional inner electrodes (3, 3a, 3b, 3c) in an alternating sequence. Outer electrodes (4, 4a) which are separate from each other are located on the outer surfaces (5, 5a) of the main body. The inner electrodes each have a connecting region and an overlapping region adjacent thereto. A rectilinear edge (16) of the connecting region is connected in an electrically conductive manner to one of the outer electrodes. The overlapping region is arranged at distances (6, 6a) from the outer electrodes. The edge of the connecting region that is connected to the outer electrode is at least as long as the extent of the overlapping region along straight lines running parallel to said edge, and the overlapping region is multiply interrupted at least along a number of said straight lines.

11 Claims, 5 Drawing Sheets

(56) References Cited

U.S. PATENT DOCUMENTS

| | | | |
|---|---|---|---|
| 2007/0047175 A1* | 3/2007 | Sato | H01G 4/012 361/303 |
| 2008/0007138 A1 | 1/2008 | Takahashi | |
| 2010/0156250 A1 | 6/2010 | Kondo et al. | |

FOREIGN PATENT DOCUMENTS

| | | |
|---|---|---|
| EP | 1416546 A1 | 5/2004 |
| EP | 2256836 A2 | 12/2010 |
| JP | H02156619 A | 6/1990 |
| JP | H09129477 A | 5/1997 |
| JP | 09-270360 | 10/1997 |
| JP | 2001167968 A | 6/2001 |
| JP | 2010-199269 A | 9/2010 |
| KR | 1020100074789 | 7/2010 |

\* cited by examiner

MULTI-LAYER COMPONENT AND METHOD FOR PRODUCING SAME

The invention relates to a multi-layer component with a layer sequence of ceramic layers and inner electrodes.

Multi-layer components, in particular varistors, have a main body which is made of ceramic layers and two-dimensional inner electrodes stacked in an alternating sequence and sintered. Outer electrodes are customarily located on two mutually opposite outer surfaces of the main body perpendicularly to the layer planes of the inner electrodes. The inner electrodes are electrically conductively connected in a successively alternating manner to in each case one of the outer electrodes. For this purpose, the inner electrodes each reach as far as the relevant outer surface of the main body and are spaced apart from the opposite outer surface and optionally also from the outer surfaces, which are present laterally with respect thereto, of the main body. The inner electrodes are arranged overlapping one another in order to form capacitances and are exposed to high current loads especially outside the region of overlap thereof. The metal used for the inner electrodes makes up a substantial portion of the production costs.

A monolithic ceramic capacitor in the form of a multi-layer component is described in DE 196 22 690 A1. Platinum, gold, palladium, alloys of said metals, in particular a silver and palladium alloy, copper, iron, cobalt, tungsten, molybdenum, nickel and nickel alloys are specified as materials for inner electrodes.

DE 197 19 174 A1 describes a multi-layer component, in which precious metals are not used for the inner electrodes and which permits the production of PTC resistors in multi-layer technology. The inner electrodes, which are referred in this document as contact layers, are produced from aluminum paste or a paste containing aluminum.

EP 1 416 546 A1 specifies a method for producing a ceramic multi-layer component, in which green sheets which contain a ceramic powder are provided by means of a screen printing method with structured metallic layers which are provided as inner electrodes of the finished component. Serrated structures of the metal layers are illustrated as examples. The serrations of the metal layers end at a distance from an edge of the green sheet. Of the metal layers, only narrow connecting strips are present on the opposite edge of the green sheet.

It is the object of the present invention to specify a multi-layer component which can be produced cost-effectively. In addition, an associated production method will be specified.

This object is achieved by the multi-layer component with the features of claim 1 and by the method for producing a multi-layer component with the features of claim 12. Refinements are revealed in the dependent claims.

The multi-layer component has a main body made of ceramic layers and two-dimensional inner electrodes in an alternating sequence. Outer electrodes which are separate from each other are located on the outer surfaces of the main body. The inner electrodes each have a connecting region and an overlapping region adjacent thereto. A rectilinear edge of the connecting region is connected to one of the outer electrodes in an electrically conductive manner. The overlapping region is arranged at distances from the outer electrodes. The edge of the connecting region that is connected to the outer electrode is at least as long as the extent of the overlapping region along straight lines running parallel to said edge, and the overlapping region is multiply interrupted at least along a number of said straight lines.

The interruptions in the inner electrodes in the overlapping region afford the possibility of saving on electrode material. The interruptions are preferably designed only to be of a size such that the maximum current-carrying capability of the component is not reduced or at least not reduced too severely in comparison to conventional multi-layer components.

The current loading of the inner electrodes is highest in each case in the connecting region and decreases in the overlapping region with increasing distance from the associated outer electrode. This is because the current flowing through the inner electrodes during operation of the component partially flows off into the ceramic layers. If the inner electrodes are not present over the entire surface in the overlapping region, but rather are interrupted transversely with respect to the current flow, the current loading of the inner electrodes is greater, at least in a section of the overlapping region, than in the case of components which have inner electrodes over the entire surface.

The current loading of the inner electrodes in the overlapping region can be limited to the current loading in the connecting region by the lateral dimensions, with respect to the current direction, of the interruptions in the inner electrodes in the overlapping region being accordingly suitably limited. In this manner, as much electrode material as possible can be saved without reducing the maximum current-carrying capability of the component in comparison to conventional multi-layer components.

In embodiments of the component, the interruptions in the overlapping region increase in the number thereof, in the size thereof or in the number and size thereof with increasing distance from the connecting region.

In further embodiments of the component, the overlapping region is structured in serrations which at least partially become narrower with increasing distance from the connecting region.

In further embodiments, the overlapping region is structured in strips.

In further embodiments, the strips are arranged perpendicularly to the edge of the connecting region that is connected to the outer electrode and are arranged parallel to one another.

In further embodiments, the overlapping region is structured in serrated strips which at least partially become narrower with increasing distance from the connecting region.

In further embodiments of the component, dimensions of the interruptions in the overlapping region are at most half the size of the distances between mutually adjacent inner electrodes.

In further embodiments, the overlapping region has a plurality of holes.

In further embodiments, the holes have a distribution, the density of which increases with increasing distance from the connecting region.

In further embodiments, the maximum dimensions, in particular the diameters of the holes, are at most half the size of the distances between mutually adjacent inner electrodes.

In further embodiments, the inner electrodes are arranged in such a manner that the overlapping regions overlap one another in a viewing direction perpendicular to the layers.

In the method for producing a multi-layer component, a main body is formed from ceramic layers and two-dimensional inner electrodes, which are provided thereon, in an alternating sequence, wherein the inner electrodes are formed by printing a ceramic green sheet in each case with a connecting region and an overlapping region adjacent thereto, and an edge of the connecting region is connected in an electrically conductive manner to an outer electrode arranged on the main body. During the printing of the green sheet, the inner electrodes are structured in such a manner that the edge of the connecting region that is to be connected to the outer electrode is at least as long as the extent of the overlapping region along straight lines running parallel to said edge, and that the overlapping region is multiply interrupted at least along a number of said straight lines.

In a refinement of the method, during the printing of the green sheet, the inner electrodes are structured in such a manner that dimensions of the interruptions in the overlapping region are at most half the thickness of the green sheet.

In a further refinement of the method, the ceramic green sheet is printed using a printing screen, and holes are formed in the overlapping region by individual openings in the printing screen being closed before the printing.

A more precise description of examples of the multi-layer component and of the production method follows with reference to the attached figures.

Figure 1:
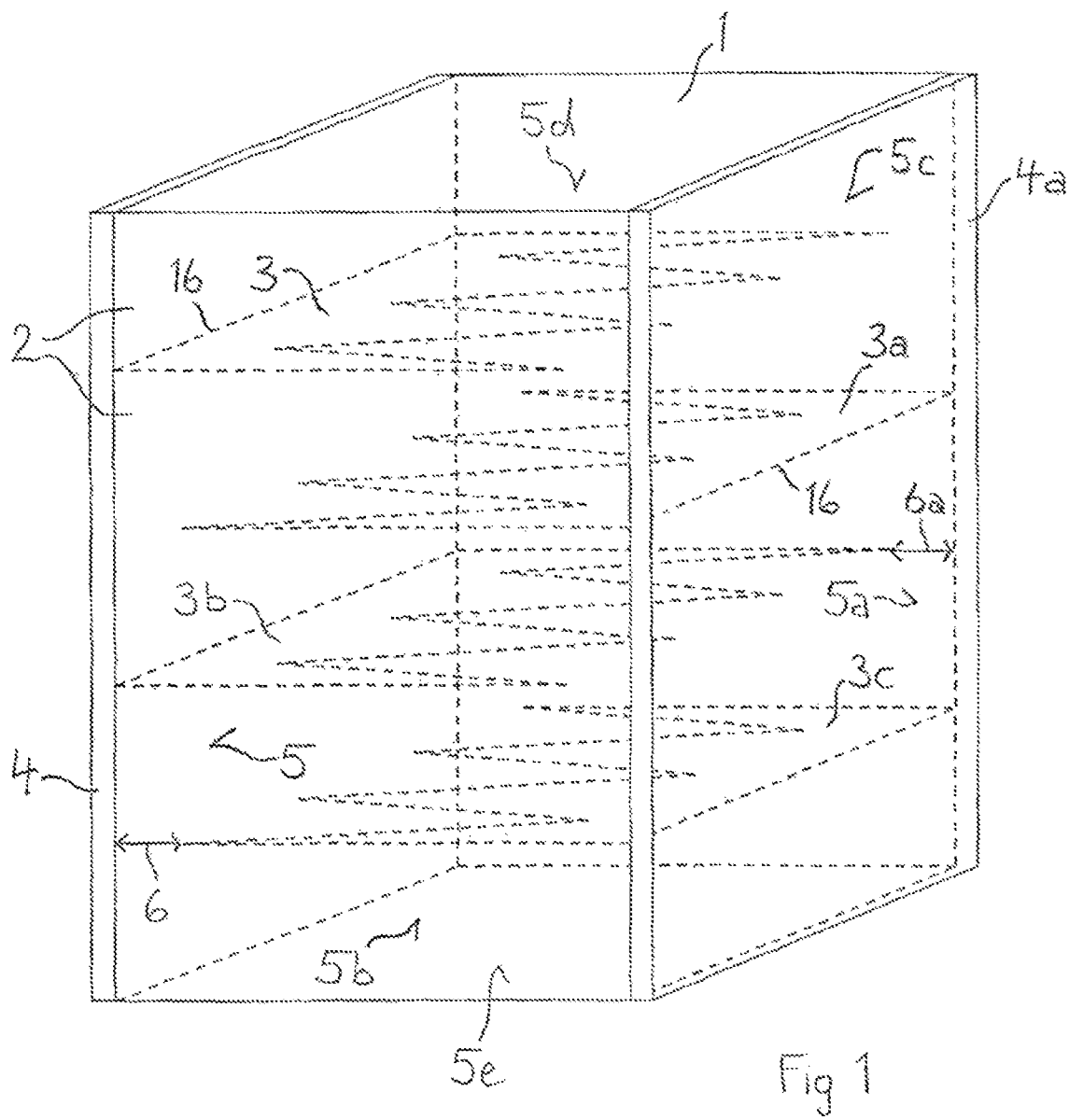
FIG. 1 shows a perspective view of an embodiment of the multi-layer component.

FIG. 1 shows a perspective view of an embodiment of the multi-layer component with a main body 1 which is constructed from ceramic layers 2 and inner electrodes 3, 3a, 3b, 3c arranged in-between. Outer electrodes 4, 4a are located on two mutually opposite outer surfaces 5, 5a of the main body 1. As an example, the outer electrodes 4, 4a are reproduced in FIG. 1 in the form of flat layers, but they can also surround the borders of the outer surfaces 5, 5a and reach for a distance onto the adjacent outer surfaces 5b, 5c, 5d, 5e. The outer electrodes 4, 4a are arranged at a distance from each other at least separate from each other and therefore permit a separate electrical connection. The inner electrodes 3, 3a, 3b, 3c are connected in an electrically conductive manner in each case to one of the outer electrodes 4, 4a by a rectilinear edge 16. Apart from the rectilinear edge 16, the connection between the inner electrodes 3, 3a, 3b, 3c and the outer electrodes 4, 4a can comprise further portions of the edge of the inner electrodes 3, 3a, 3b, 3c, in particular if the outer electrodes 4, 4a surround borders of the main body 1 and the inner electrodes 3, 3a, 3b, 3c are adjacent to the lateral outer surfaces 5b, 5c.

According to the example shown in FIG. 1 in particular, the inner electrodes 3, 3a, 3b, 3c can be connected in a successively alternating manner to the outer electrodes 4, 4a such that, for example, the inner electrodes 3 and 3b are connected to the outer electrode 4, and the inner electrodes 3a and 3c are connected to the outer electrode 4a. This results in the formation of groups of inner electrodes 3 and 3b and 3a and 3c which are electrically connected to one another and, in the perpendicular top view of the layers 2, appear mirrored with respect to one another and partially overlap one another.

On the side opposite the electrically connected edge 16, the inner electrodes 3, 3a, 3b, 3c are at a distance 6, 6a from the outer electrode 4, 4a present there and are consequently connected in an electrically conductive manner only to one of the outer electrodes 4, 4a. It can be seen in FIG. 1 that the inner electrodes 3, 3a, 3b, 3c are structured in a particular manner, which is explained in more detail below with reference to FIGS. 2 to 6.

Figure 2:
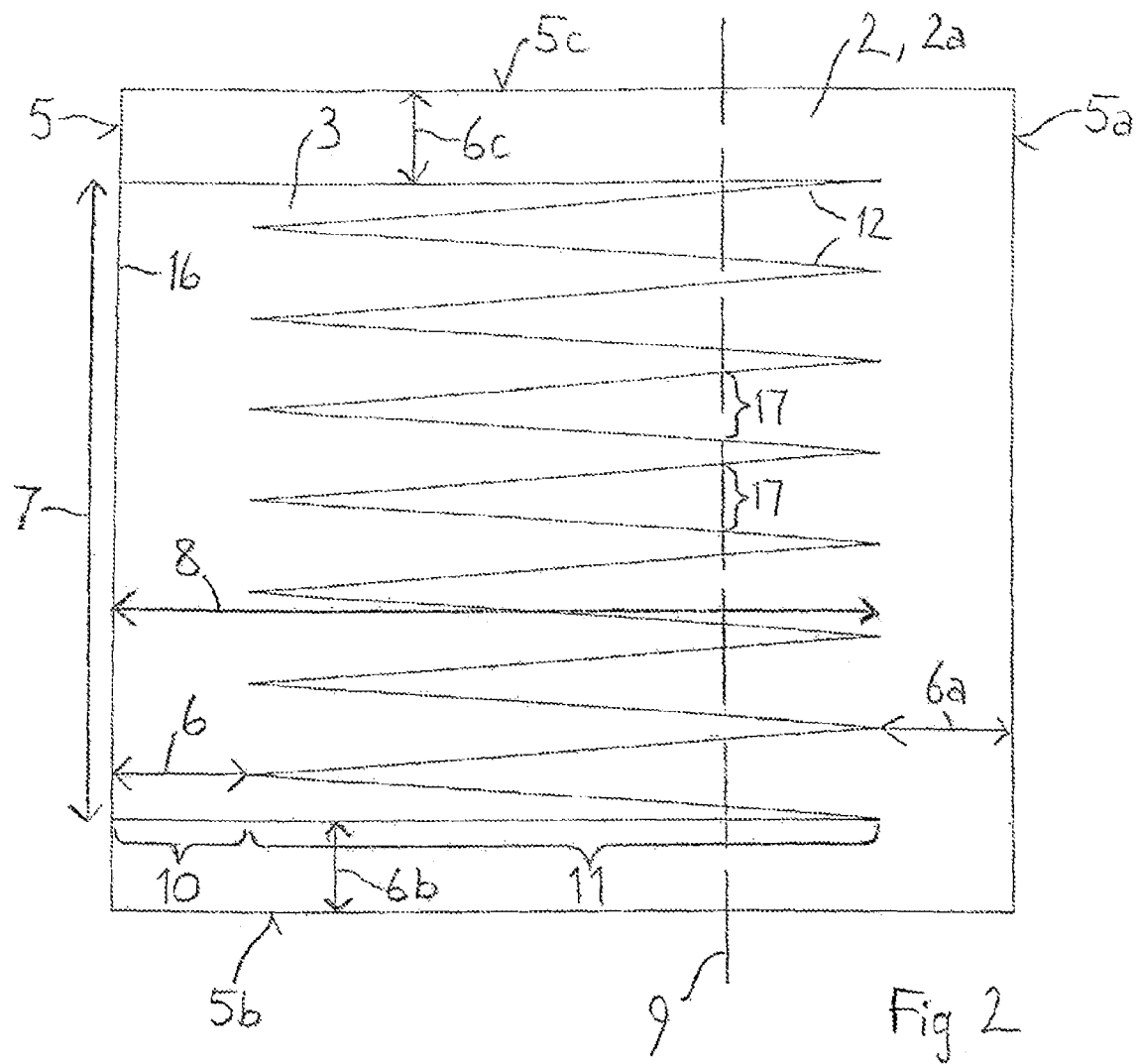
FIG. 2 shows a layer with a top view of an embodiment of an inner electrode.

FIG. 2 shows a ceramic layer 2 or a green sheet 2a, which is used for producing a ceramic layer, with a top view of an embodiment of an inner electrode 3. The inner electrode 3 has a connecting region 10 and an overlapping region 11. An edge 16 of the connecting region 10, which reaches as far as an outer surface 5 of the main body, is provided to be connected in an electrically conductive manner to an outer electrode provided on the relevant outer surface 5. On the opposite side, the inner electrode 3 is arranged at a distance 6a from the outer surface 5a. The overlapping region 11 therefore remains spaced apart from the two outer surfaces 5, 5a. The distance 6 of the overlapping region 11 from the edge 16 of the connecting region 10 corresponds to a dimension of the connecting region 10 and, in the example of FIG. 2, is equal to the distance 6a of the inner electrode 3 from the opposite outer surface 5a. In the vertical top view of the layers 2 in the overlapping region 11, the inner electrodes 3, 3a, 3b, 3c of the layer stack overlap. The inner electrode 3 can also be at distances 6b, 6c from the lateral outer surfaces 5b, 5c or, instead, can reach as far as said outer surfaces 5b, 5c.

Dimensions 7, 8 of the inner electrode 3 are drawn in in FIG. 2, specifically a first dimension 7 which is measured parallel to the edge 16, and a second dimension 8 which is measured perpendicularly to the edge 16 in the surface of the inner electrode 3. The edge 16 has the length of the first dimension 7. The inner electrode 3 may also have the first dimension 7 in the overlapping region 11, as in the embodiment according to FIG. 2. Instead, the overlapping region 11 may be narrower than the first dimension 7. The edge 16 of the connecting region 10 is therefore at least as long as the extent of the overlapping region 11 along straight lines 9 running parallel to said edge 16.

In the embodiment according to FIG. 2, the overlapping region 11 is structured in serrations 12 such that the second dimension 8 is reached only by the points of the serrations 12. The serrations 12 have the effect that the overlapping region 11 is multiply interrupted along a straight line 9 running parallel to the edge 16. The interruptions 17 can reach as far as the connecting region 10, as shown in FIG. 2. In other embodiments, the overlapping region 11 is multiply interrupted only along a straight line 9 running parallel to the edge 16 at a distance from the connecting region 10. The serrations 12 and the corresponding intermediate spaces between the serrations 12 begin at a distance from the connecting region 10 in these embodiments.

Figure 3:
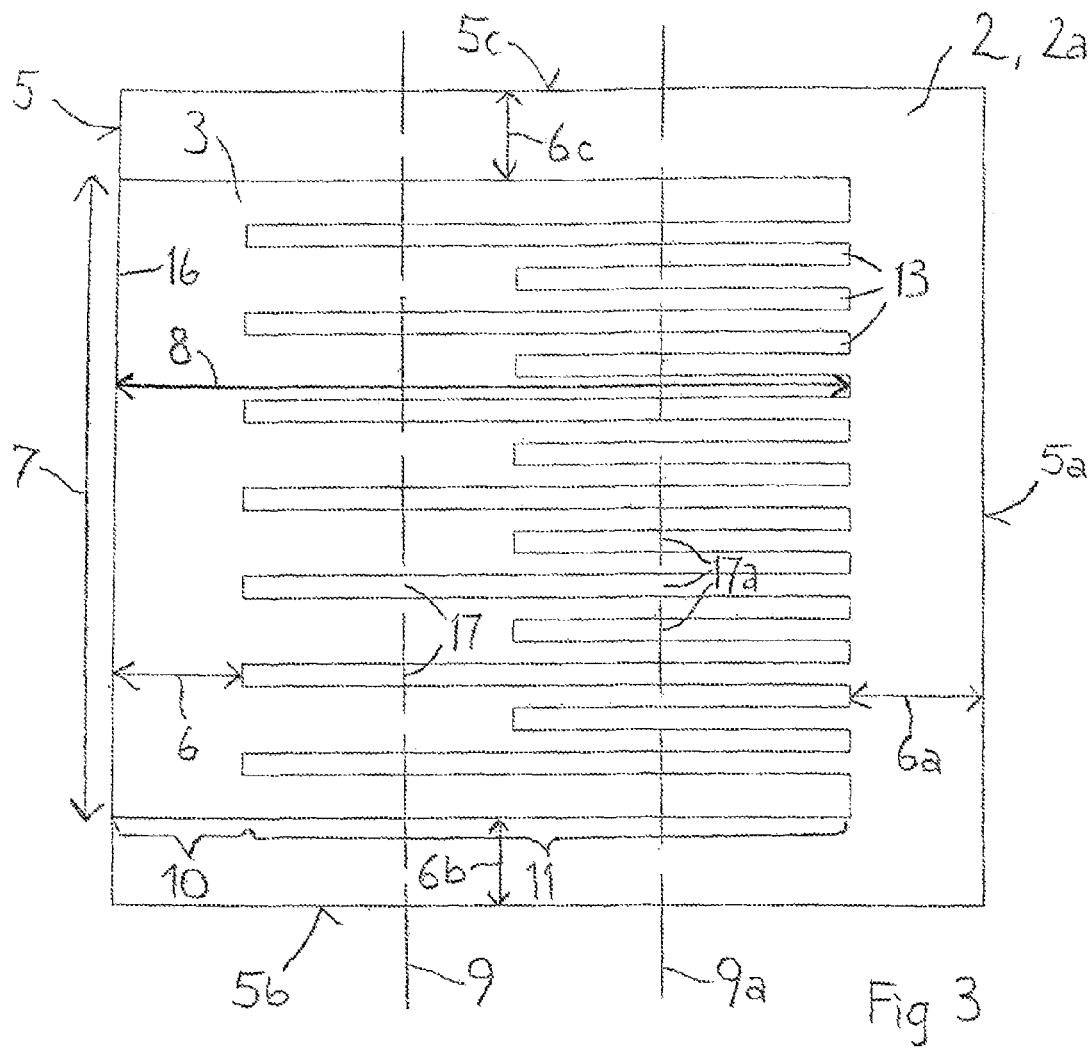
FIG. 3 shows a layer with a top view of a further embodiment of an inner electrode.

FIG. 3 shows a ceramic layer 2 or a green sheet 2a, which is used for producing a ceramic layer, with a top view of a further embodiment of an inner electrode 3. Those elements of FIG. 3 which correspond to elements of FIG. 2 are provided with the same reference numbers and are not described once again.

In the embodiment according to FIG. 3, strips 13 are present instead of the serrations 12 in the overlapping region 11. The strips 13 preferably each end at the distance 6a before the outer surface 5a opposite the edge 16, and therefore the inner electrode 3 has the second dimension 8 thereof in the region of the strips 13. Some of the strips 13 may instead end at a greater distance from the outer surface 5a. The strips 13 are arranged perpendicularly to the edge 16 of the connecting region 10 and parallel to one another and are separated from one another by intermediate spaces of differing lengths. The strips 13 may instead be arranged differently, in particular, for example, parallel to one another and not perpendicularly to the edge 16 of the connecting region 10. Along a straight line 9 parallel to the edge 16, the interruptions 17 are present in a smaller number than the interruptions 17a along a straight line 9a which runs at a greater distance from the connecting region 10 and is parallel to the edge 16. In preferred embodiments, the interruptions 17 in the overlapping region 11 increase in the number thereof, in the size thereof or in the number and size thereof with increasing distance from the connecting region 10. This is also the case in the embodiment of FIG. 4. In further embodiments, the overlapping region 11 is multiply interrupted only along a straight line 9 running parallel to the edge 16 at a distance from the connecting region 10. In this case, the strips 13 and the corresponding intermediate spaces between the strips 13 begin only at a distance from the connecting region 10.

Figure 4:
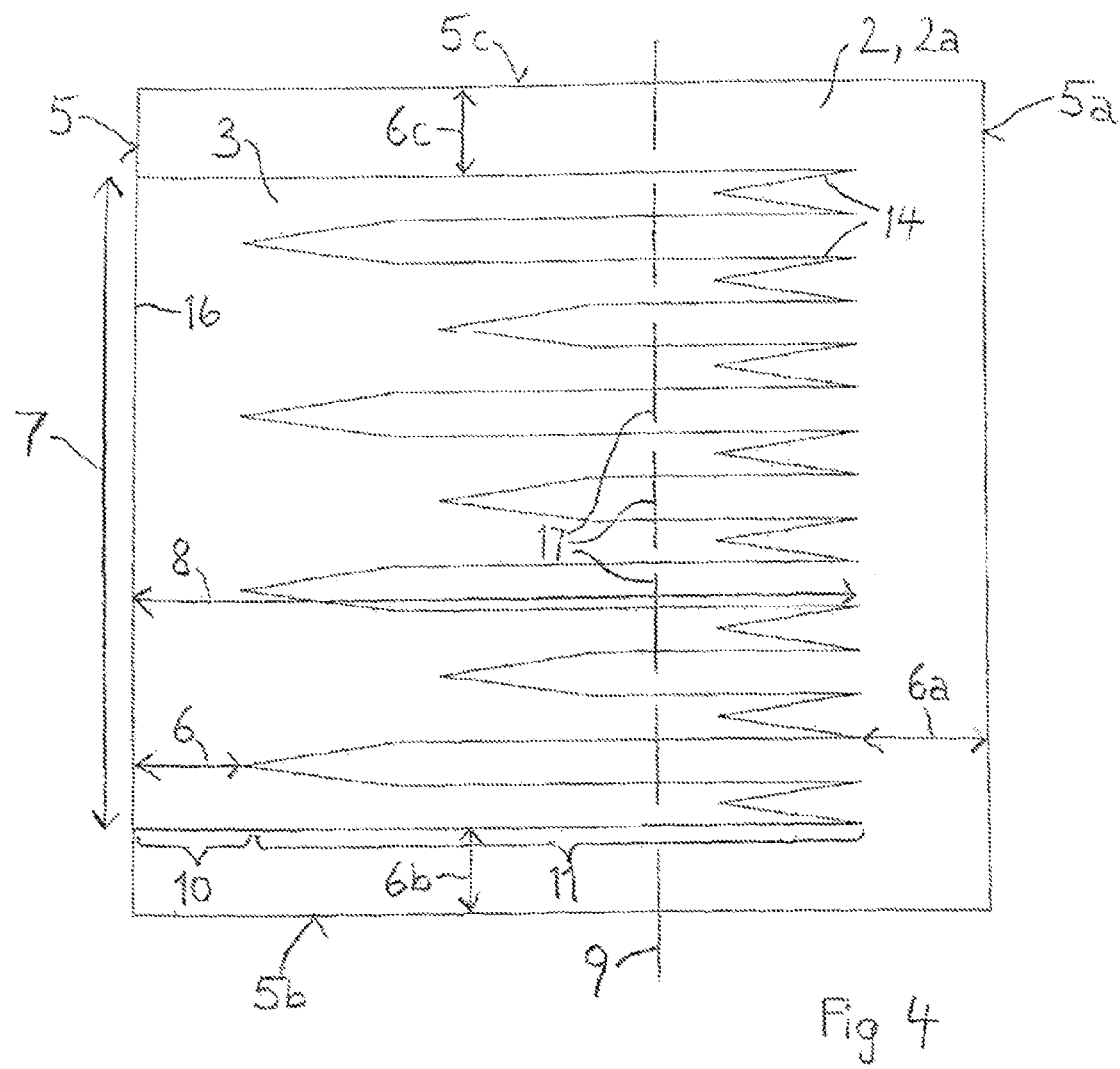
FIG. 4 shows a layer with a top view of a further embodiment of an inner electrode.

FIG. 4 shows a ceramic layer 2 or a green sheet 2a, which is used for producing a ceramic layer, with a top view of a further embodiment of an inner electrode 3. Those elements of FIG. 4 which correspond to elements of FIG. 2 are provided with the same reference numbers and are not described once again.

In the embodiment of FIG. 4, there are serrated strips 14 between which the interruptions 17 are present along a straight line 9, which is parallel to the edge 16, in the overlapping region 11. The serrated strips 14 become at least partially narrower with increasing distance from the connecting region 10. The serrated strips 14 are arranged perpendicularly to the edge 16 of the connecting region 10 and parallel to one another and are separated from one another by intermediate spaces of differing lengths. Instead, the serrated strips 14 may be arranged differently, in particular, for example, parallel to one another and not perpendicularly to the edge 16 of the connecting region 10. The interruptions 17 present along a straight line 9 parallel to the edge 16 are present at a large distance from the connecting region 10 in a greater number than at a small distance from the connecting region 10. In further embodiments, the overlapping region 11 is multiply interrupted only along a straight line 9 running parallel to the edge 16 at a distance from the connecting region 10. In embodiments of this type, the intermediate spaces between the serrated strips 14 begin at a distance from the connecting region 10.

Figure 5:
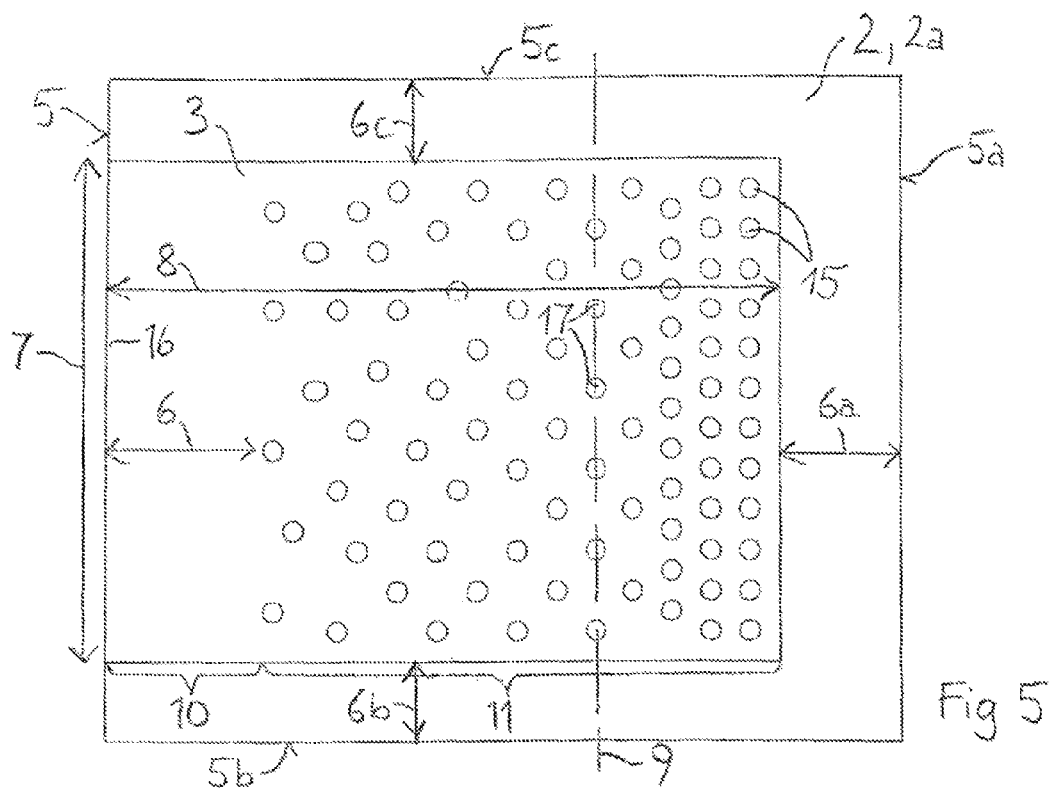
FIG. 5 shows a layer with a top view of a further embodiment of an inner electrode.

FIG. 5 shows a ceramic layer 2 or a green sheet 2a, which is used for producing a ceramic layer, with a top view of a further embodiment of an inner electrode 3. Those elements of FIG. 5 which correspond to elements of FIG. 2 are provided with the same reference numbers and are not described once again.

In the embodiment of FIG. 5, holes 15 with which the interruptions 17 are formed along a straight line 9 parallel to the edge 16 are present in the overlapping region 11. As can be gathered directly from FIG. 5, the interruptions 17 do not need to be present along each straight line 9, which is parallel to the edge 16, in the overlapping region 11. There can therefore be at least one such straight line 9 which is not intersected by any of the holes 15. However, it may be of advantage if the holes 15 have a distribution, the density of which increases with increasing distance from the connecting region 10. The holes 15 can have, for example, a circular edge and all have the same diameter. Instead, the diameters of the holes 15 may be different. The holes 15 may have different shapes and the same or different sizes. The holes 15 do not need to be present in the entire overlapping region 11 but rather, instead, can be provided only at a distance from the connecting region 10.

Further embodiments emerge from a combination of the features of the structures of the inner electrodes 3, 3a, 3b, 3c, which structures are described with reference to FIGS. 2 to 5. Also in the case of such embodiments, the interruptions in the overlapping region 11 preferably increase in the number thereof, in the size thereof or in the number and size thereof with increasing distance from the connecting region 10.

Figure 6:
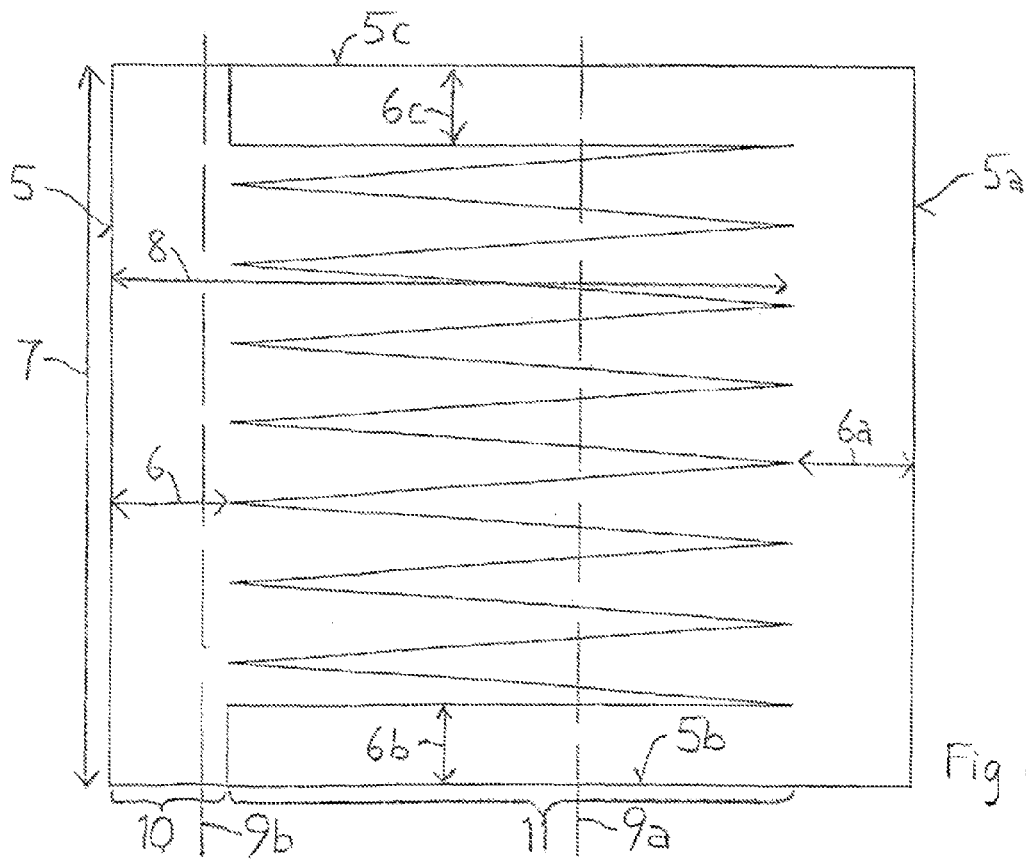
FIG. 6 shows a layer with a top view of a further embodiment of an inner electrode.

FIG. 6 shows a further embodiment which largely corresponds to the embodiment according to FIG. 2. In the embodiment according to FIG. 6, the first dimension 7 is equal to the width of the outer surface 5, and therefore the connecting region 10 reaches as far as the two lateral outer surfaces 5b, 5c. The overlapping region 11 is at distances 6b, 6c from the lateral outer surfaces 5b, 5c and is consequently narrower than the connecting region 10. Also in the case of embodiments according to FIGS. 3 to 5, the connecting region 10 can be wider than the overlapping region 11. The inner electrode 3 has the maximum width thereof, corresponding to the first dimension 7, at the rectilinear edge 16 of the connecting region 10. It is of advantage if the connecting region 10 is as wide as possible, since the greatest current loading occurs between the outer electrode 4 and the overlapping region 11, i.e. in the connecting region 10, during operation of the component.

It is advantageous if the interruptions 17 are not too large so that the electric field is as homogeneous as possible during the operation of the component. For this purpose, the dimensions of the interruptions 17 in the direction parallel to the edge 16 of the connecting region 10 should at most be half the size, preferably at most a third of the size, of the distances between mutually adjacent inner electrodes 3, 3a, 3b, 3c in the layer stack of the main body 1. In embodiments with holes 15 in the overlapping region 11, the diameters or the maximum dimensions of the holes 15 should at most be half the size, preferably at most a third of the size, of the distances between mutually adjacent inner electrodes 3, 3a, 3b, 3c in the layer stack of the main body 1. If the ceramic layers 2 between adjacent inner electrodes 3, 3a, 3b, 3c have a thickness of, for example, 150 μm, the maximum dimensions of holes or the maximum widths of slots in the inner electrodes 3, 3a, 3b, 3c should typically be not more than approximately 50 μm.

In addition, it should be taken into consideration that, as a result of the interruptions 17, the current flow during the operation of the component is not as homogeneous as in the case of an inner electrode over the entire surface, and therefore, from this aspect, smaller dimensions of the interruptions 17 may possibly be preferred. The structure of the inner electrodes 3, 3a, 3b, 3c can be adapted in such a manner that the maximum current-carrying capability of the component is virtually unchanged in comparison to conventional multi-layer components and the operating properties of the component are hardly affected, if at all.

The multi-layer component has the further advantage of being able to be produced in accordance with conventional components, with only the structure of the inner electrodes having to be changed. This takes place particularly simply if the inner electrodes are produced on a green sheet by a printing method, in particular a screen printing method. In this case, only the printing template has to be suitably configured. During the printing of the green sheet 2a, the inner electrodes 3, 3a, 3b, 3c are structured by means of a suitably designed printing template in such a manner that the edge 16 of the connecting region 10 that is to be connected to the outer electrode 4, 4a is at least as long as the extent of the overlapping region 11 along straight lines 9, 9a running parallel to said edge 16 and that the overlapping region 11 is multiply interrupted at least along a number of said straight lines 9, 9a. The described embodiments, in particular, can be produced by said method.

LIST OF REFERENCE NUMBERS

1 Main body
2 Ceramic layer
2a Green sheet
3, 3a, 3b, 3c Inner electrode
4, 4a Outer electrode
5, 5a, 5b, 5c, 5d, 5e Outer surface
6, 6a, 6b, 6c Distance
7 First dimension
8 Second dimension
9, 9a, 9b Straight line
10 Connecting region
11 Overlapping region
12 Serrations
13 Strips
14 Serrated strips
15 Hole
16 Edge of the connecting region
17 Interruption in the overlapping region

The invention claimed is:

1. A multi-layer component comprising:
a main body which has ceramic layers and two-dimensional inner electrodes in an alternating sequence, and also outer surfaces,
wherein the inner electrodes each have a connecting region and an overlapping region adjacent thereto; and
outer electrodes which are separate from each other on the outer surfaces of the main body,
wherein a rectilinear edge of the connecting region is connected to one of the outer electrodes in an electrically conductive manner,
wherein the overlapping region is arranged at distances from the outer electrodes,
wherein the edge of the connecting region that is connected to the outer electrode is at least as long as the extent of the overlapping region along straight lines running parallel to the edge,
wherein the overlapping region is multiply interrupted at least along a number of said straight lines, and
wherein dimensions of the interruptions in the overlapping region are at most half the size of the distances between mutually adjacent inner electrodes.

2. The multi-layer component according to claim 1, wherein the interruptions in the overlapping region increase in the number thereof, in the size thereof or in the number and size thereof with increasing distance from the connecting region.

3. The multi-layer component according to claim 1, wherein the overlapping region is structured in serrations, and the serrations at least partially become narrower with increasing distance from the connecting region.

4. The multi-layer component according to claim 1, wherein the overlapping region is structured in strips.

5. The multi-layer component according to claim 4, wherein the strips are arranged perpendicularly to the edge of the connecting region that is connected to the outer electrode and are arranged parallel to each other.

6. The multi-layer component according to claim 1, wherein the overlapping region is structured in serrated strips which at least partially become narrower with increasing distance from the connecting region.

7. The multi-layer component according to claim 1, wherein the interruptions in the overlapping region are formed as a plurality of holes.

8. The multi-layer component according to claim 7, wherein the holes have a distribution, the density of which increases with increasing distance from the connecting region.

9. The multi-layer component according to claim 7 or 8, wherein maximum dimensions of the holes are at most half the size of the distances between mutually adjacent inner electrodes.

10. The multi-layer component according to claim 1, wherein the inner electrodes are arranged in such a manner that the overlapping regions overlap one another in a viewing direction perpendicular to the layers.

11. A method for producing a multi-layer component, wherein a main body is formed from ceramic layers and two-dimensional inner electrodes, which are provided thereon, in an alternating sequence,
wherein the inner electrodes are formed by printing a ceramic green sheet in each case with a connecting region and an overlapping region adjacent thereto,
wherein an edge of the connecting region is connected in an electrically conductive manner to an outer electrode arranged on the main body,
wherein during the printing of the green sheet, the inner electrodes are structured in such a manner that the edge of the connecting region that is to be connected to the outer electrode is at least as long as the extent of the overlapping region along straight lines running parallel the said edge, and that the overlapping region is multiply interrupted at least along a number of said straight lines,
wherein, during the printing of the green sheet, the inner electrodes are structured in such a manner that dimensions of the interruptions in the overlapping region are at most half the thickness of the green sheet.

* * * * *